(12) United States Patent
Asao et al.

(10) Patent No.: US 6,429,552 B2
(45) Date of Patent: *Aug. 6, 2002

(54) A.C. GENERATOR FOR VEHICLE

(75) Inventors: Yoshihito Asao; Katsumi Adachi, both of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/496,336

(22) Filed: Feb. 2, 2000

(30) Foreign Application Priority Data

Oct. 15, 1999 (JP) .......................................... 11-293857

(51) Int. Cl.[7] .............................. H02K 3/32; H02K 3/34; H02K 3/04
(52) U.S. Cl. ........................... 310/64; 310/45; 310/180; 310/201; 310/260
(58) Field of Search ................................ 310/201, 179, 310/180, 196, 195, 43, 45, 263, 254, 260, 64, 65

(56) References Cited

U.S. PATENT DOCUMENTS

| | | | | |
|---|---|---|---|---|
| 2,967,959 A | | 1/1961 | Waters ........................ 310/64 |
| 3,151,262 A | * | 9/1964 | Howard et al. .............. 310/260 |
| 3,242,358 A | * | 3/1966 | Balke et al. ................. 310/260 |
| 4,778,842 A | * | 10/1988 | Taniguchi et al. ........... 524/504 |
| 5,097,167 A | * | 3/1992 | Kanayama et al. .......... 310/201 |
| 5,235,229 A | | 8/1993 | Tanaka et al. ................ 310/62 |
| 5,757,102 A | * | 5/1998 | Adachi et al. .............. 310/263 |
| 6,091,169 A | * | 7/2000 | Umeda et al. ................ 310/62 |

FOREIGN PATENT DOCUMENTS

| | | | |
|---|---|---|---|
| DE | 1124592 | * 2/1960 | |
| EP | 0 917 278 A2 | 5/1999 | |
| EP | 0 978 927 A1 | 2/2000 | |
| EP | 0 917 278 A3 | 5/2000 | |
| EP | 1 020 976 A2 | 7/2000 | |
| JP | 62-178139 | 8/1987 | |
| JP | 62-272836 | 11/1987 | |
| JP | 10-174367 | 6/1998 | |
| JP | 2927288 | 5/1999 | .......... H02K/19/22 |
| JP | 11-164505 | 6/1999 | ............ H02K/3/24 |

* cited by examiner

Primary Examiner—Burton S. Mullins
(74) Attorney, Agent, or Firm—Sughrue Mion, PLLC

(57) ABSTRACT

In an a.c. generator for a vehicle, a resin 25 is disposed on coil ends 16a, 16b of a stator coil 16 to clog gaps in the stator coil 16 at the coil ends 16a, 16b, whereby insulation of the coil ends is improved; durability to vibrations is assured; and a wind noise is reduced.

17 Claims, 14 Drawing Sheets

F I G. 2
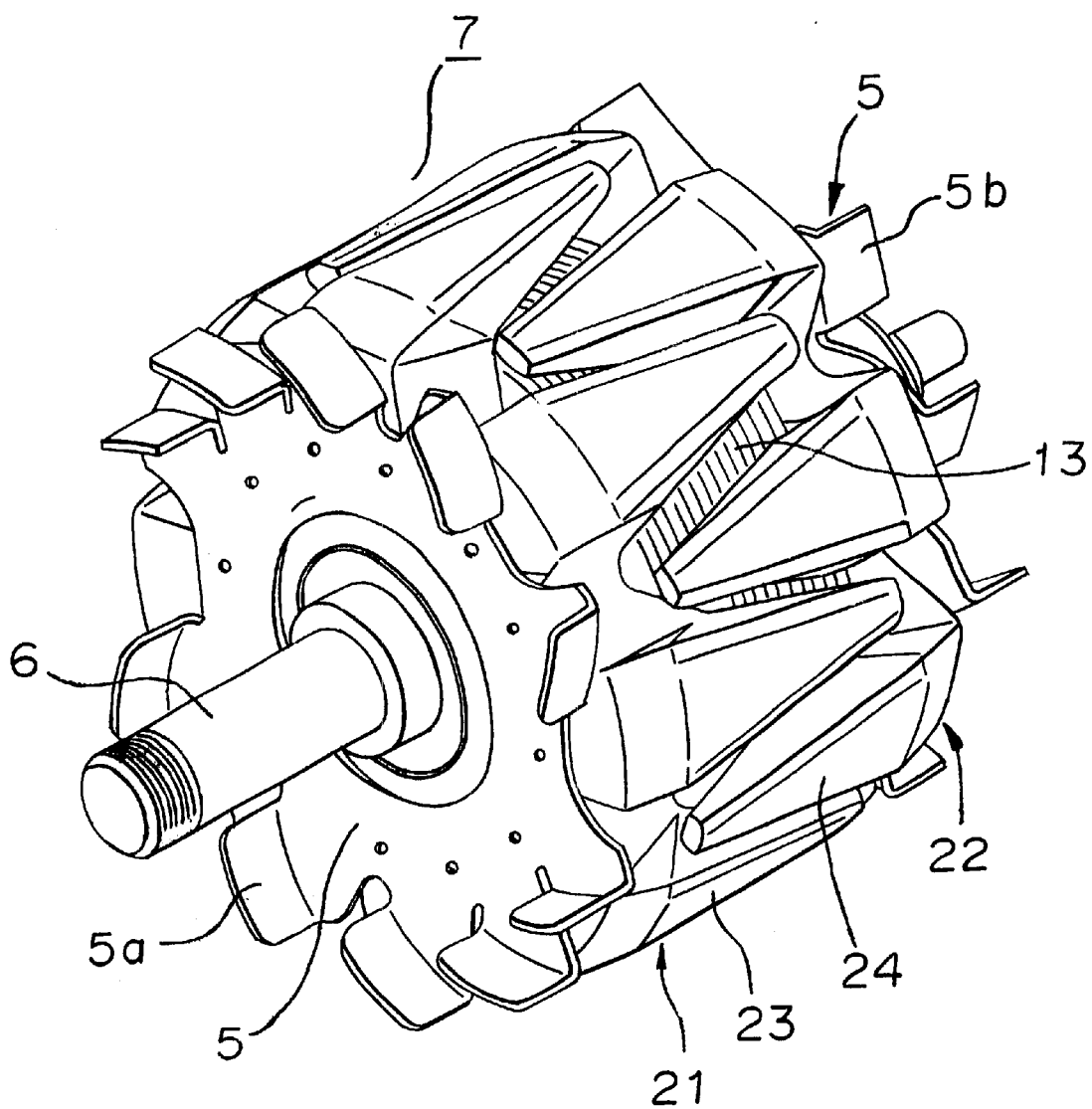

A.C. GENERATOR FOR VEHICLE

BACKGROUND OF THE INVENTION

1. Field of the Invention

The present invention relates to an a.c. generator for a vehicle which is equipped in, for example, a passenger car or a truck.

2. Discussion of Background

A conventional a.c. generator for a vehicle is disclosed in, for example, JP-B-2927288. In this conventional technique, a plurality of substantially U-like conductor segments are used as a stator coil. In slots of the stator, the conductor segments are paired as an inner layer and an outer layer along depth directions of the slots to be a single pair or a plurality of pairs and arranged in the slots in a state that the conductor segments are mutually insulated. Outside of the slots, the conductor segments are arranged by protruding from an end surface side of the stator core, wherein a coil end group mainly has repeating serially connected patterns, by which different layers in the separated slots are serially connected in correspondence with an NS magnetic pole pitch of a rotator.

At a coil end, the plurality of the conductor segments are arranged interposing intervals so as to cross a ventilating direction of a cooling air in a frame, whereby the cooling air flows by crossing the plurality of the conductor segments at the coil end.

In other words, in this conventional technique, because the conductor segments are mutually separated at the coil end and the cooling air passes across the plurality of the conductor segments at the coil end, it is aimed to improve cooling of the coil end to thereby obtain a high output.

In the above conventional technique, because the conductor segments at the coil end of the stator coil are separately arranged interposing spaces therebetween, there is problems that a short occurs by a contact between adjacent coils at the coil end or between joining portions of the adjacent coils in receipt of vibrations from an engine to thereby decrease the output and generate noises.

Further, there are problems that the joining portions at the coil end are disconnected by the vibrations of the a.c. generator and that a temperature excessively increases by a connection resistance as a result of a crack.

Further, there is a problem of wind noise caused by uncomfortable high order interference sound between an edge of a molten joining portion of the coil end caused by welding and an edge of a claw-like magnetic pole of a rotator or a fan occurs because the coil end of the stator coil is positioned on a discharge side of a the cooling air.

Further, there is a problem that high order wind noise occurs because of cooling air passing through a gap between coils at the coil end of the stator.

Incidentally, in JP-A-11-164505, it is disclosed that insulation is assured by providing a gap between coils at a coil end of a stator coil. However, there is a problem that the insulation is spoiled when an extraneous matter intrudes between the coils and the coil is deformed by a collision of the extraneous matter.

SUMMARY OF THE INVENTION

It is an object of the present invention to solve the above-mentioned problems inherent in the conventional technique and to provide an a.c. generator for a vehicle which improves insulation at a coil end of a stator coil, keeps vibration proof, and reduces wind noise.

According to a first aspect of the present invention, there is provided an a.c. generator for vehicle, in which a resin is disposed in a coil end of a stator coil and a gap between coils at the coil end is clogged.

According to a second aspect of the present invention, there is provided the a.c. generator for a vehicle, in which a resin is disposed on an inner peripheral surface of the coil end of the stator coil to clog a gap between coils.

According to a third aspect of the present invention, there is provided the a.c. generator for a vehicle, in which a resin is disposed on an entire periphery of the inner peripheral surface and of an outer peripheral surface of the coil end of the stator coil to clog a gap between the coils.

According to a fourth aspect of the present invention, there is provided the a.c. generator for vehicle, in which a resin is disposed on surfaces of coils forming the coil end of the stator coil to clog a gap between the coils.

According to a fifth aspect of the present invention, there is provided the a.c. generator for vehicle, in which the surfaces of the coil end of the stator coil is formed to be plane without any unevenness by the resin disposed in the coil end of the stator coil.

According to a sixth aspect of the present invention, there is provided the a.c. generator for a vehicle, wherein on a surface of the stator coil at the coil end, a protrusion is formed by the disposed resin.

According to a seventh aspect of the present invention, there is provided the a.c. generator for a vehicle, wherein the resin is disposed at coil ends on both sides in an axial direction of the stator coil.

According to an eighth aspect of the present invention, there is provided the a.c. generator for a vehicle, wherein a conductor segment has a substantially U-like shape, and the stator coil has a coil end on a side of connecting the substantially U-like segments and another coil end on a side of bending the substantially U-like segments.

According to a ninth aspect of the present invention, there is provided the a.c. generator for a vehicle, wherein a blower means is a fan provided in an end portion of the rotator.

According to a tenth aspect of the present invention, there is provided the a.c. generator for a vehicle, wherein the fan is lapped in the coil end of the stator coil in peripheral directions of the fan.

According to an eleventh aspect of the present invention, there is provided the a.c. generator for a vehicle, wherein fans are provided on both sides of end portions of the rotator, respectively opposite to the connected side and the bent side of the coil ends, and a commutator is provided on the bent side.

According to a twelfth aspect of the present invention, there is provided the a.c. generator for a vehicle, wherein an air flow received by the coil end on the connected side of the stator coil is larger than that received by the coil end on the bent side.

According to a thirteenth aspect of the present invention, there is provided the a.c. generator for a vehicle, wherein the number of blades of the fan opposite to the coil end on the bent side is larger than the number of blades of the fan opposite to a coil end on the connected side.

According to a fourteenth aspect of the present invention, there is provided the a.c. generator for a vehicle, wherein the maximum height of the blades of the fan on the bent side is larger than the maximum height of the blades of the fan on the connected side.

According to a fifteenth aspect of the present invention, there is provided the a.c. generator for a vehicle, wherein spaces formed between base plates of the fan on the bent side are substantially shielded by an end surface of the magnetic poles of the rotator.

According to a sixteenth aspect of the present invention, there is provided the a.c. generator for a vehicle, wherein a separator is provided between recessed portions of the magnetic poles on a side of the commutator in the rotator and a bottom portion of the fan.

According to a seventeenth aspect of the present invention, there is provided the a.c. generator for a vehicle, wherein the conductor segments are formed by a flat rectangular coil.

According to an eighteenth aspect of the present invention, there is provided the a.c. generator for a vehicle, wherein an insulating paper is provided to insulate the stator core from the stator coil and also insulate the stator coils from each other in the slots of the stator, and the stator coil is a bare wire.

According to a nineteenth aspect of the present invention, there is provided the a.c. generator for a vehicle, wherein the resin is mainly composed of an epoxy resin.

According to a twentieth aspect of the present invention, there is provided the a.c. generator for a vehicle, wherein an additive having heat conductivity larger than that of the resin is mixed in the resin.

According to a twenty-first aspect of the present invention, there is provided the a.c. generator for a vehicle, wherein the resin is disposed in the coil end by powder coating.

According to a twenty-second aspect of the present invention, there is provided the a.c. generator for a vehicle, wherein the resin is disposed in the coil end by fluidization dip.

According to a twenty-third aspect of the present invention, there is provided the a.c. generator for a vehicle, wherein the resin is a single liquid type dried at an ordinary temperature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a perspective view illustrating a rotator used in the a.c. generator for vehicle according to Embodiment 1 of the present invention;

DETAILED DESCRIPTION OF THE PREFERRED EMBODIMENTS

A detailed explanation will be given of preferred Embodiments of the present invention in reference to FIGS. 1 through 14 as follows, wherein the same numerical references are used for the same or similar portions and description of these portions is omitted.

Embodiment 1

Figure 1:
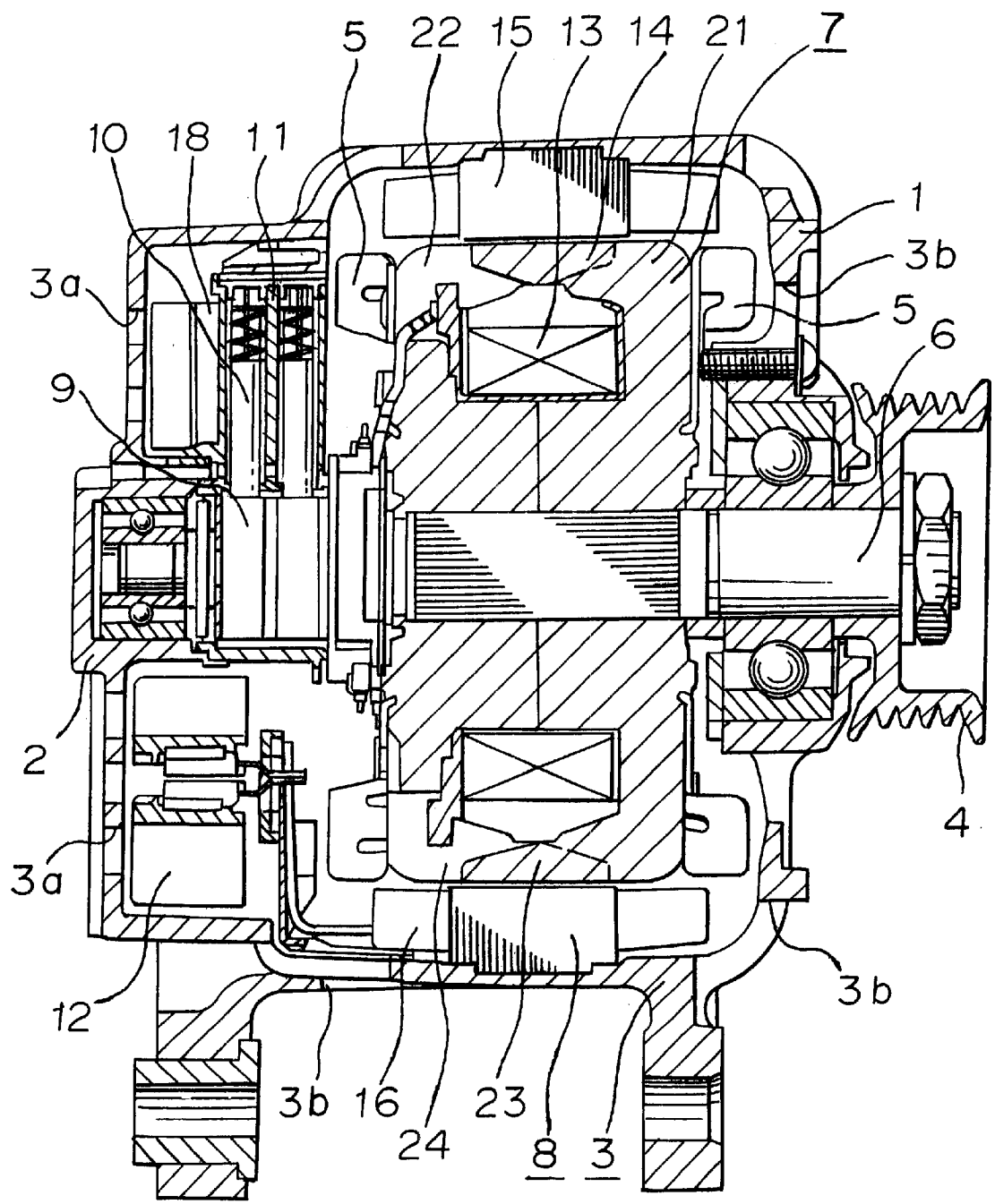
FIG. 1 is a crosssectional view illustrating an a.c. generator for vehicle according to Embodiment 1 of the present invention.
Figure 3:
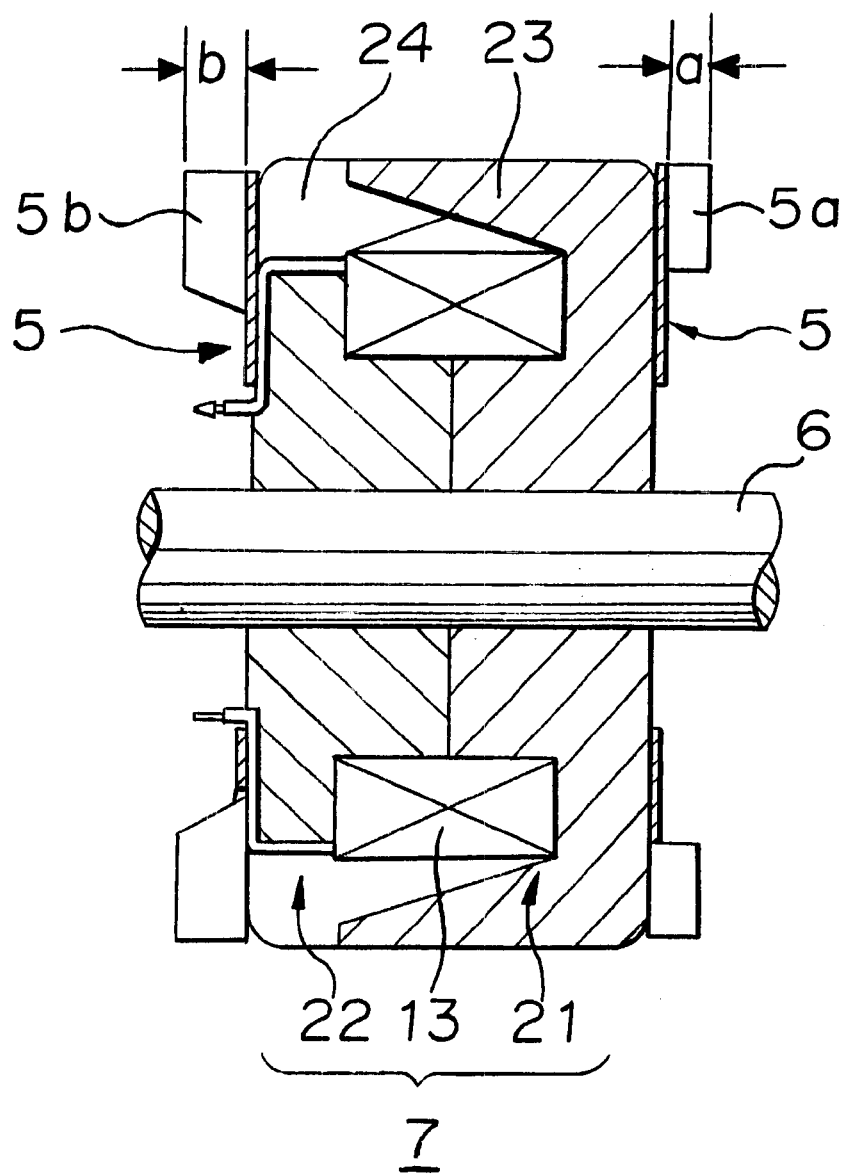
FIG. 3 is a crosssectional view illustrating the rorator used in the a.c. generator for vehicle according to Embodiment 1 of the present invention.
Figure 4:
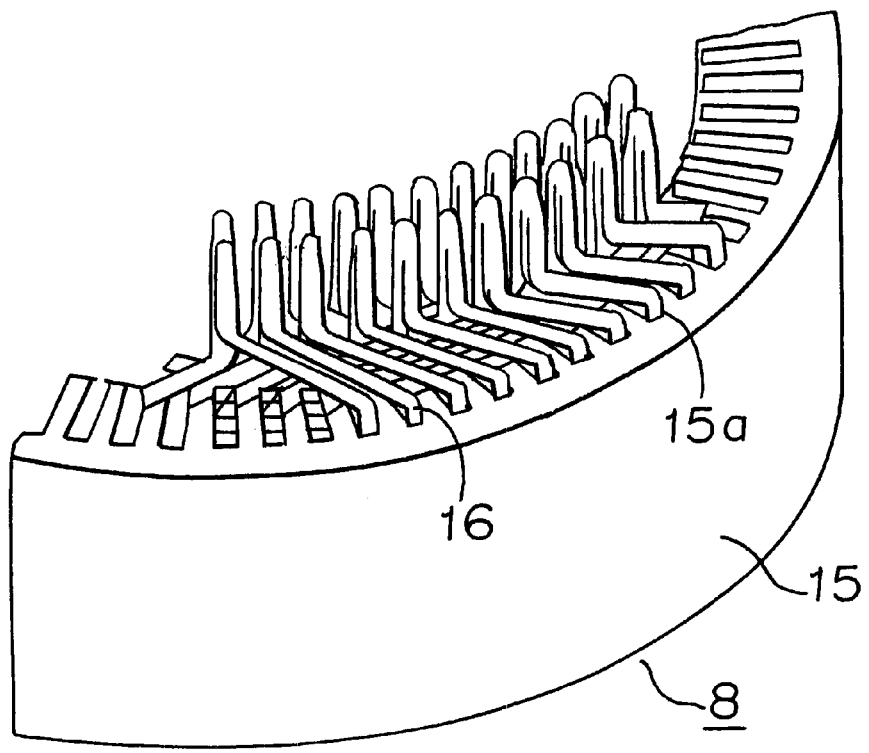
FIG. 4 is a perspective view illustrating a part of a stator, to which conductor segments are assembled, used in the a.c. generator for vehicle according to Embodiment 1 of the present invention.
Figure 4:
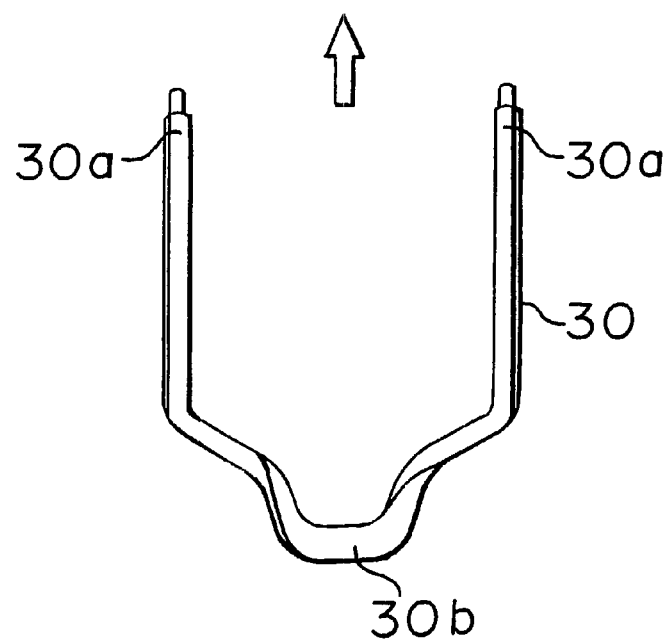
Figure 5:
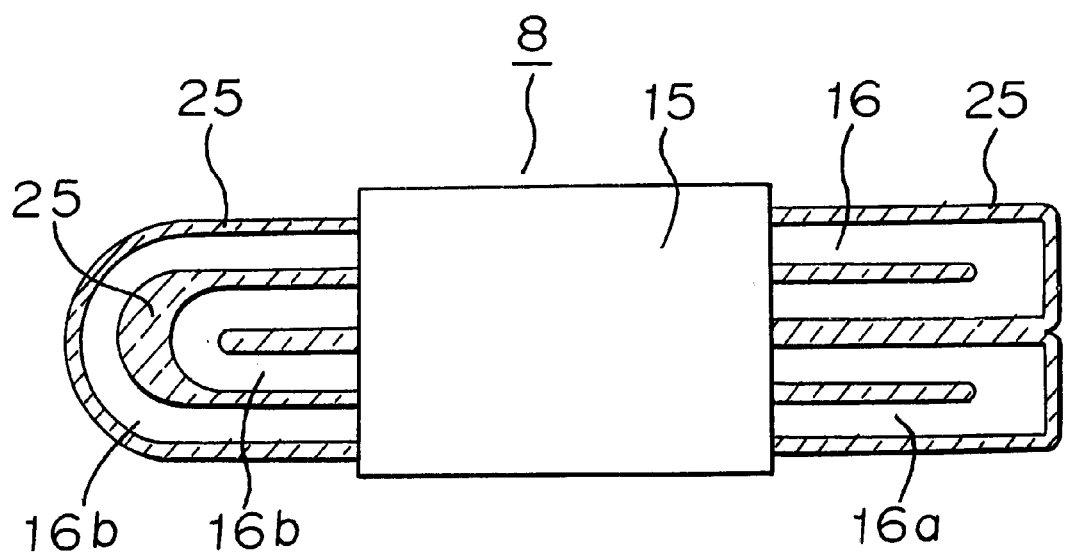
FIG. 5 is a crosssectional view illustrating the stator used in the a.c. generator for vehicle according to Embodiment 1 of the present invention.
Figure 6:
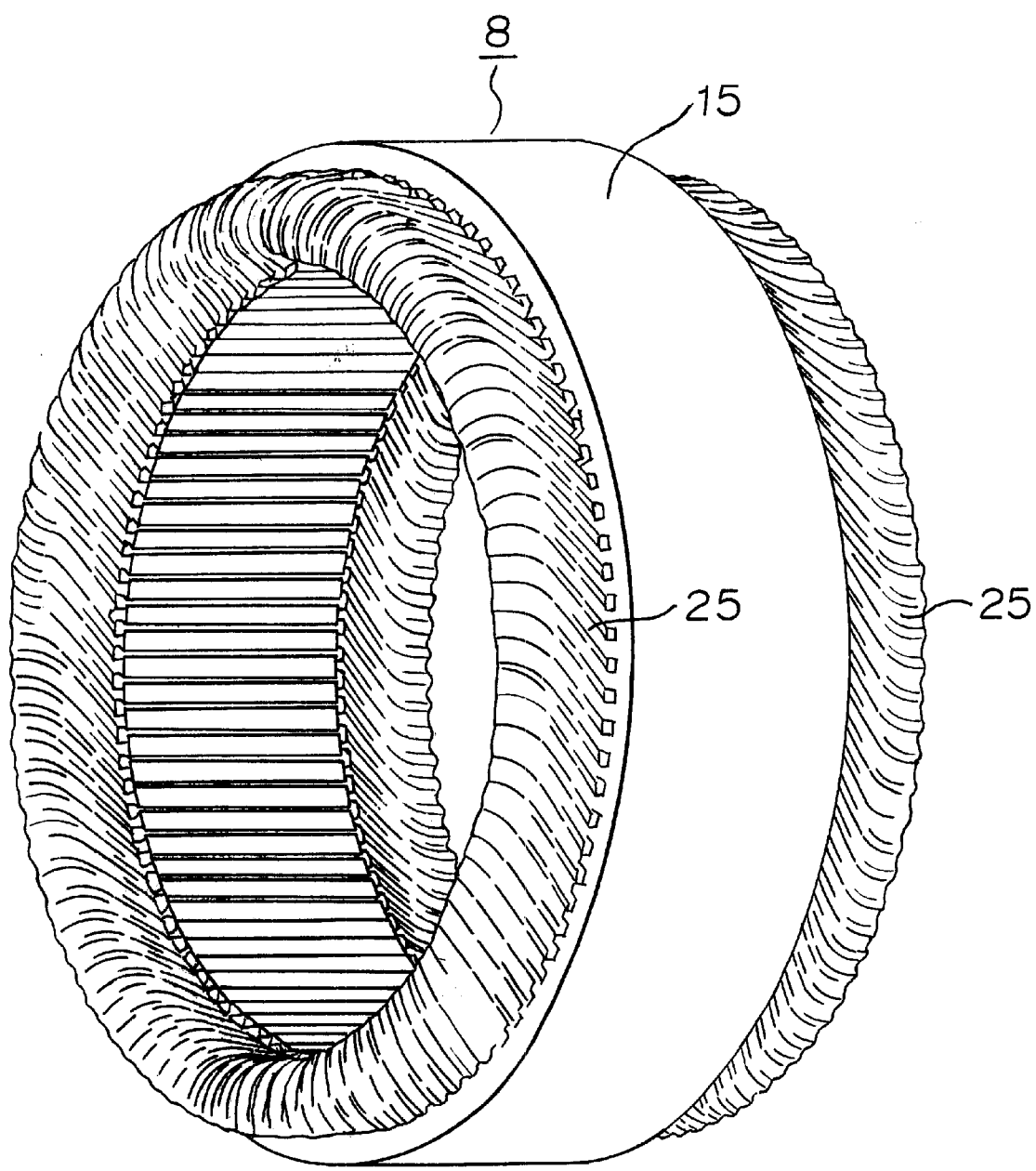
FIG. 6 is a perspective view illustrating the stator used in the a.c. generator for vehicle according to Embodiment 1 of the present invention.

FIG. 1 is a crosssectional view of an a.c. generator for vehicle according to Embodiment 1. FIG. 2 is a perspective view of a rotator illustrated in FIG. 1. FIG. 3 is a crosssectional view of the rotator illustrated in FIG. 1. FIG. 4 is a perspective view for explaining an assembling step of a stator coil illustrated in FIG. 1. FIG. 5 is a crosssectional view illustrating a stator in FIG. 1. FIG. 6 is a perspective view illustrating the stator illustrated in FIG. 1.

The a.c. generator for a vehicle includes a front bracket 1 made of aluminum, and rear bracket 2, a casing 3 as a frame constructed by the front bracket 1 and the rear bracket 2, a pully 4, a shaft 6 to one end of which is fixed to the pully 4, the shaft 6 is provided in the casing 3, a rotator 7 of a claw pole type fixed to the shaft 6, fans 5 fixed on both sides of the rotator 7, a stator 8 fixed to an inner wall surface of the casing 3, a slipring 9 fixed to the other end portion of the shaft 6 for supplying an electric current to the rotator 7, a pair of brushes 10 which are slidably in contact with the slipring 9, a brush holder 11 accommodating the brushes 10, a commutator 12 electrically connected to the stator 8 for commutating an a.c. current to a d.c. current, and a regulator 18 engaged with the brush holder 11, for adjusting the magnitude of an a.c. voltage generated by the stator 8.

In the casing 3, an intake hole 3a for taking a a cooling air into the casing 3 by rotation of the fan 5 and an exhaust hole 3b for discharging the cooling air to an outside by rotation of the fan 5 are formed.

The rotator 7 includes a rotator coil 13 for generating a magnetic flux by an electric current, and pole core 14 covering the rotator coil 13, which pole core is served as a magnetic pole by the magnetic flux. The pole core 14 is formed by a first pole core portion 21 and a second pole core portion 22, which are paired to be mutually engaged. The first pole core portion 21 and the second pole core portion 22 are respectively made of iron and respectively have clawlike magnetic poles 23, 24.

Fans 5 are fixed on both sides of the rotator 7. The fan 5 on a front side, being a pully side, has blades 5a, for example, as many as ten. The fan 5 on a rear side, being a side of the commutator 12, has blades 5b, for example, as many as twelve.

The heights b of the rear blades 5b in an axial direction are larger than the heights a of the blades 5a on the front side.

The stator 8 is constructed by a stator core 15 and a stator coil 16. The stator core 15 is shaped like a cylinder, in which a plurality of teeth having a substantially rectangular cross-section are provided in peripheral directions of the stator with an equal angular pitch so as to inwardly protrude in radial directions, and slots 15a for accommodating the coil 16 are provided between the teeth. A direction of groove of each slot 15a is in parallel with the axial direction, and the slots open toward the inner periphery.

The stator coil 16 is formed by connecting a large number of conductor segments 30 so as to be predetermined winding. The conductor segments 30 are made of a copper wire having a crosssectional shape of a flat rectangle, around which wire an insulating coating is provided. The conductor segments 30 are formed to be a substantially U-like shape, wherein a pair of legs 30a are connected at a bent portion 30b in a substantially V-like shape. Further, a pitch between the pair of legs 30a of the conductor segment is prepared to be as much as six slots.

The pairs of the legs 30a of the conductor segments 30 are inserted into groups of the slots 15a, respectively separately arranged by six slots, from a rear side of the stator core; and portions of the legs 30a protruding from a front side of the stator core are bent; and protruding portions of the legs 30a are connected by, for example, welding to resultantly form the winding.

As for the stator coil 16, four wires are arranged in each slot so as to have a four layer structure, in the radial directions of the stator core. On a bent side of the conductor segments 30, a most inner layer (first layer) and a most outer layer (fourth layer) are paired, and a second layer and a third layer are paired. These paired layers are respectively inserted into slots 15a apart by one magnetic pole pitch. On the connected side of the conductor segment 30, the most outer layer and the third layer and the most inner layer is welded, and the second layer is welded. On the bent side of the conductor segments 30, the most inner layer and the most outer layer are disposed so as to cover peripheries of the second layer and the third layer. In the stator coil 16, a front side coil end 16a and a rear side coil end 16b are included.

Each of the coil ends 16a, 16b of the stator coil 16 is respectively provided to partly wrap the fan 5 in radial directions of the stator core. The coil ends 16a, 16b of the stator coil 16 receives air when the fans 5 are rotated. An air flow received by the coil end on the front side is larger than that of the rear side because the commutator 12, the brush holder 11, the regulator 18 and so on are arranged on the rear side so as to increase a resistance against air passage of the cooling air. In the a.c. generator for a vehicle, the number of phases of the stator coil 16 is three and the number of poles of the rotator 7 is sixteen, wherein the number of the slots 15a of the stator core 15 is ninety-six.

Thus constructed stator 8 is heated and bathed in a fluidization dip vessel, in which epoxy powders float. Thereafter, a resin 25 having a predetermined thickness of 0.1 mm is coated on entire surfaces of an inner peripheral surface and an outer peripheral surface of the stator coil 16. The resin is mainly composed of an epoxy of a single liquid, which is dried at an ordinary temperature.

At the coil ends 16a, 16b of the stator coil 16 coated by the resin 25, surfaces of the coil ends 16a, 16b have protrusions and recesses respectively at portions where the coil is underlaid and intermediate portions where the coil is not underlaid. Especially, the bent portions and the joining portions make larger protrusions and larger recesses.

In FIGS. 5 and 6, a state that the resin 25 is coated is illustrated.

Spaces between the coil ends 16a and between the coil ends 16b are completely clogged by the resin 25, whereby the cooling air from the fans do not pass in the radial directions.

In Embodiment 1, the spaces between the coil ends 16a and between the coil ends 16b are clogged by the resin 25, and the coils are connected via the resin 25, whereby the coils at the coil ends 16a and the coil ends 16b and the joining portions of the coil are not in contact with each other by vibrations of the engine. Therefore, it is possible to prevent a short and a noise from occurring.

Further, even though the a.c. generator is vibrated, the joining portions at the coil ends 16a, 16b are not separated and the joining portions are not cracked, it is possible to solve problems such as a large contact resistance and a temperature increment.

Further, even though the joining portions at the coil ends 16a, 16b are melted by welding and become edges, the edges are coated by the resin 25 to have a round-like shape, whereby it is possible to solve problems such that a high order uncomfortable interference sound occurring at the shoulders of the claw-like magnetic poles 23, 24 and at the fans 5, and that the wind noise is generated.

Further, because the spaces between the coil ends 16a, 16b of the stator coil 16 are clogged by the resin 25, it is possible to solve a problem that a high order wind noise is caused by the cooling air passing through the spaces in the conventional technique.

Further, it is possible to solve a problem that insulation is spoiled by an extraneous matter intruded between the coil ends 16a, 16b or by deformation of the coil upon a direct collision of an extraneous matter to the coil.

Further, it is possible to extremely improve insulation of the coil because the coil ends 16a, 16b of the stator coil 16 are completely covered by the resin 25 around their entire peripheries.

Embodiment 2

Figure 7:
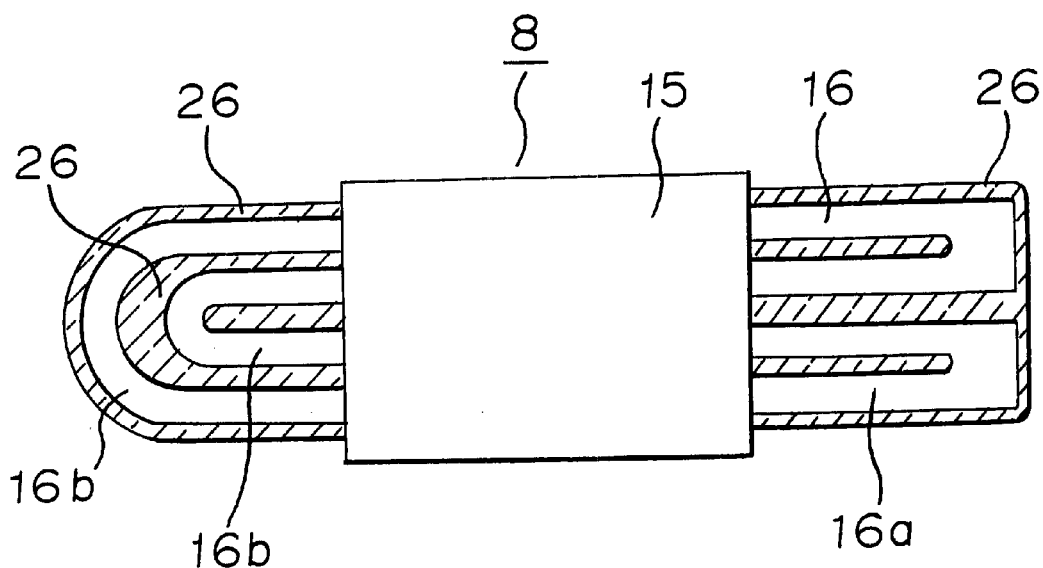
FIG. 7 is a crosssectional view illustrating a stator used in an a.c. generator for vehicle according to Embodiment 2 of the present invention.
Figure 8:
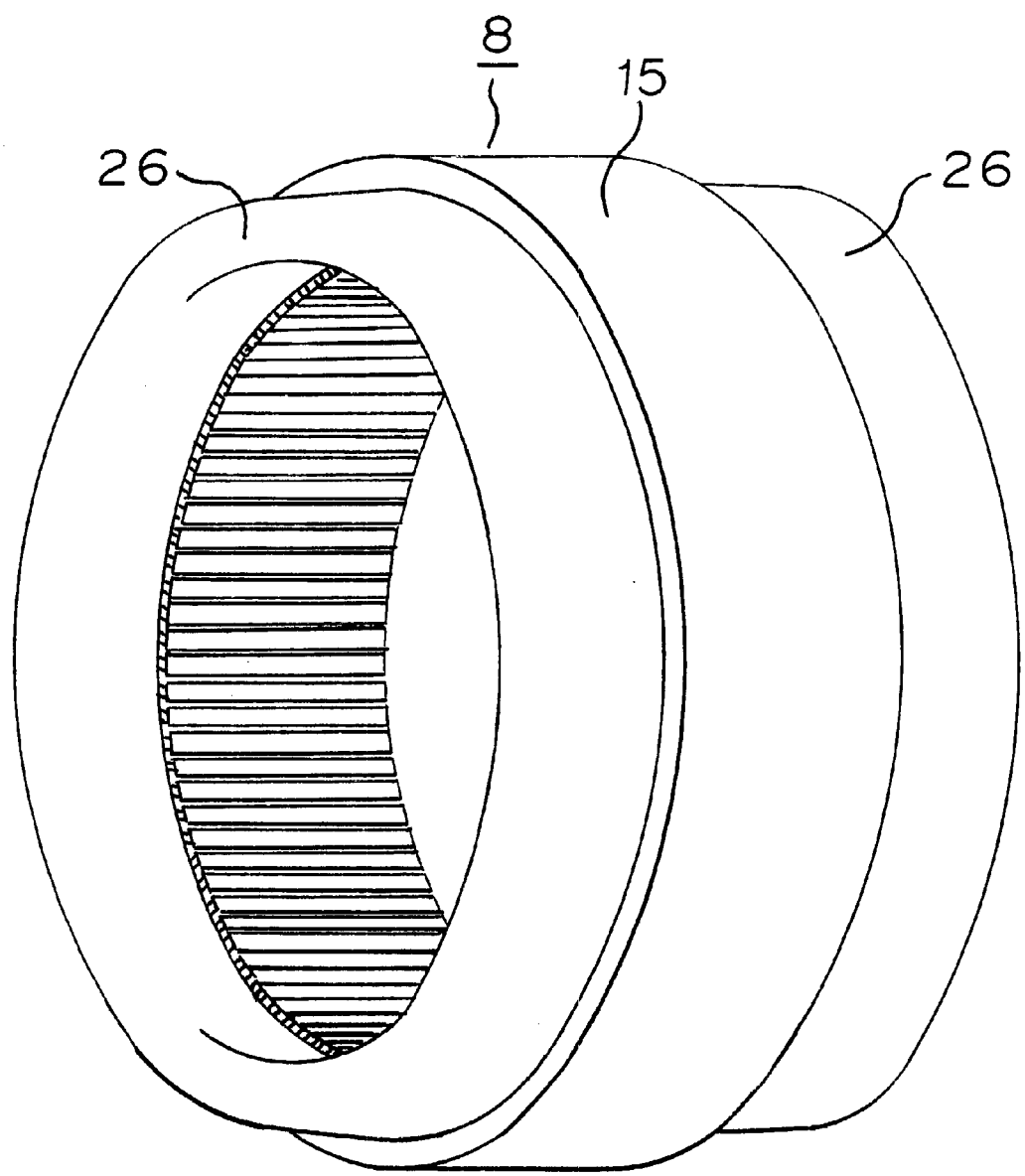
FIG. 8 is a perspective view illustrating the stator used in the a.c. generator for vehicle according to Embodiment 2 of the present invention.

Although in Embodiment 1, the surface of the resin 26 coated on the inner peripheral surfaces and the outer peripheral surfaces respectively of the coil ends 16a, 16b has the recesses and the protrusions resectively at where the coil is underlaid and where the coil is not underlaid, surfaces of a resin 26 is plane without recesses and protrusions caused by an underlying coil in Embodiment 2 as illustrated in FIGS. 7 and 8.

In Embodiment 2, insulation of the coil ends 16a, 16b of the stator coil 16 is improved, insulation of a joining portion of the coil end 16a is improved, and it is possible to extremely reduce a wind noise caused at surfaces of the coil in an inner peripheral portion and an outer peripheral portion.

Embodiment 3

Figure 9:
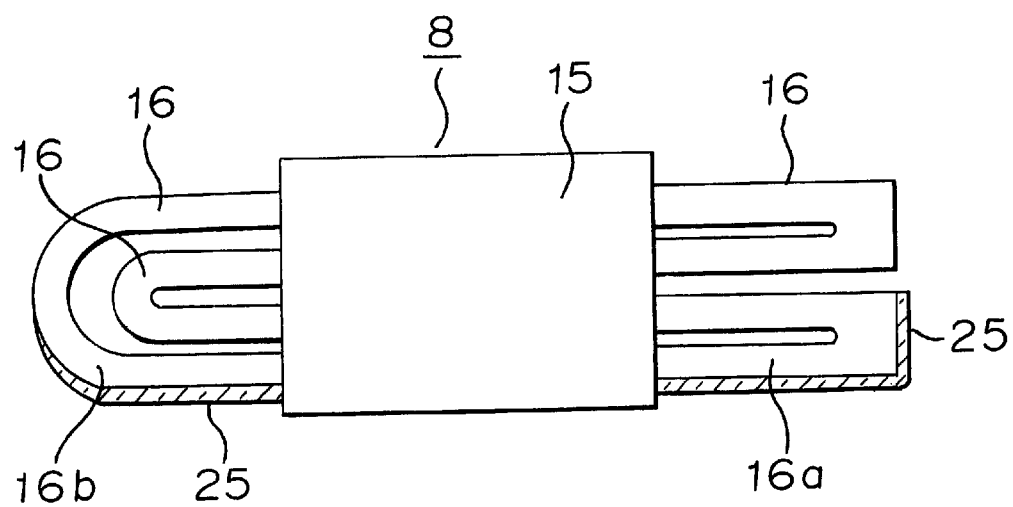
FIG. 9 is a crosssectional view illustrating a stator used in an a.c. generator for vehicle according to Embodiment 3 of the present invention.
Figure 10:
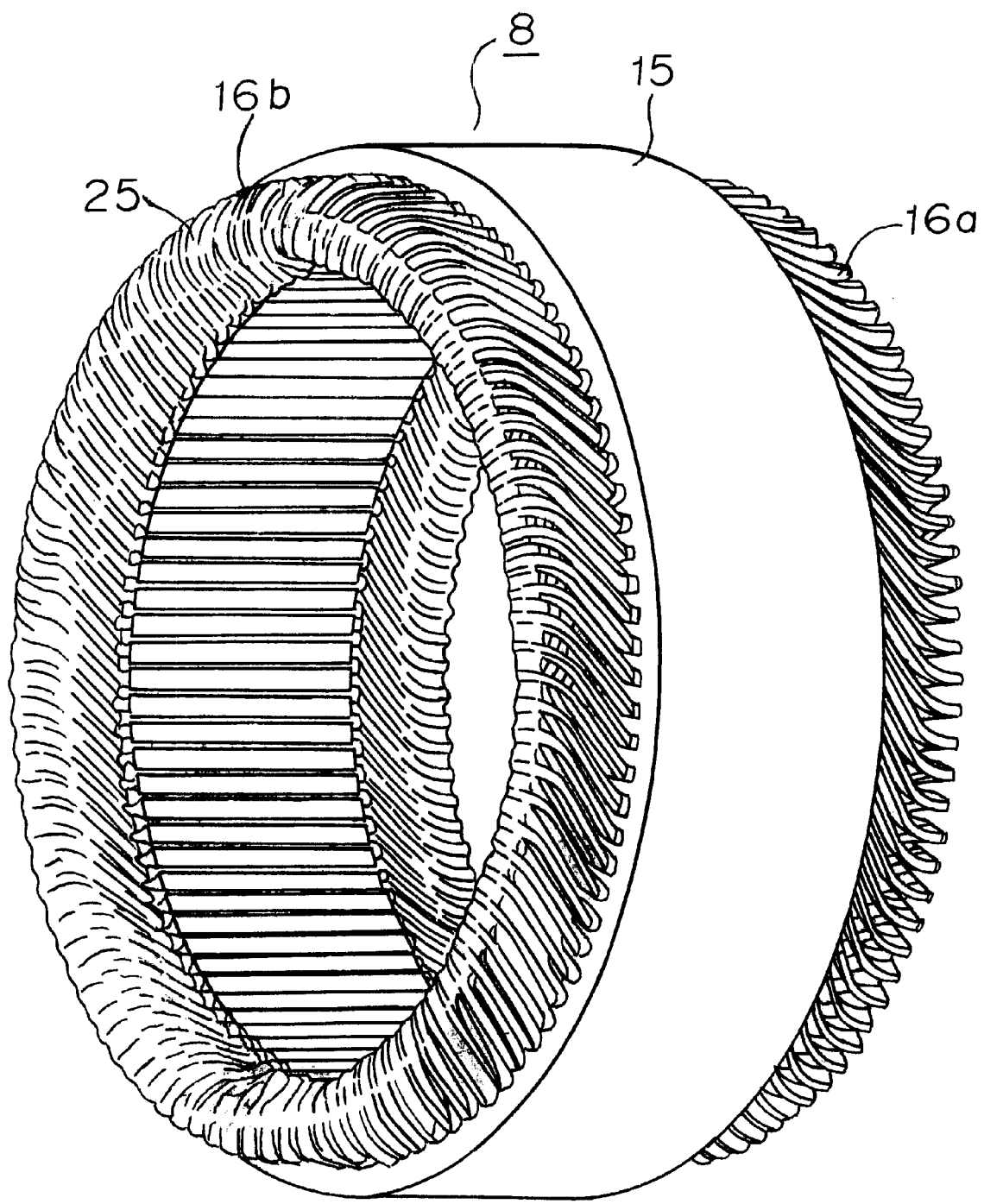
FIG. 10 is a perspective view illustrating the stator used in the a.c. generator for vehicle according to Embodiment 3 of the present invention.

As illustrated in FIGS. 9 and 10, a resin 25 may be coated only on inner peripheral surfaces of the coil ends 16a, 16b of the stator coil 16 so as to clog spaces between the coil ends 16a and between the coil ends 16b.

In this case, because the resin 25 is coated only on the inner peripheral surfaces of the coil ends 16a, 16b, an operation of coating the resin 25 can be easy, and the amount of the resin 25 becomes small, whereby a production cost becomes low.

Further insulation of the coil on an inner peripheral side is improved, and a wind noise caused between the coil ends in the inner peripheral portion can be reduced.

Embodiment 4

Figure 11:
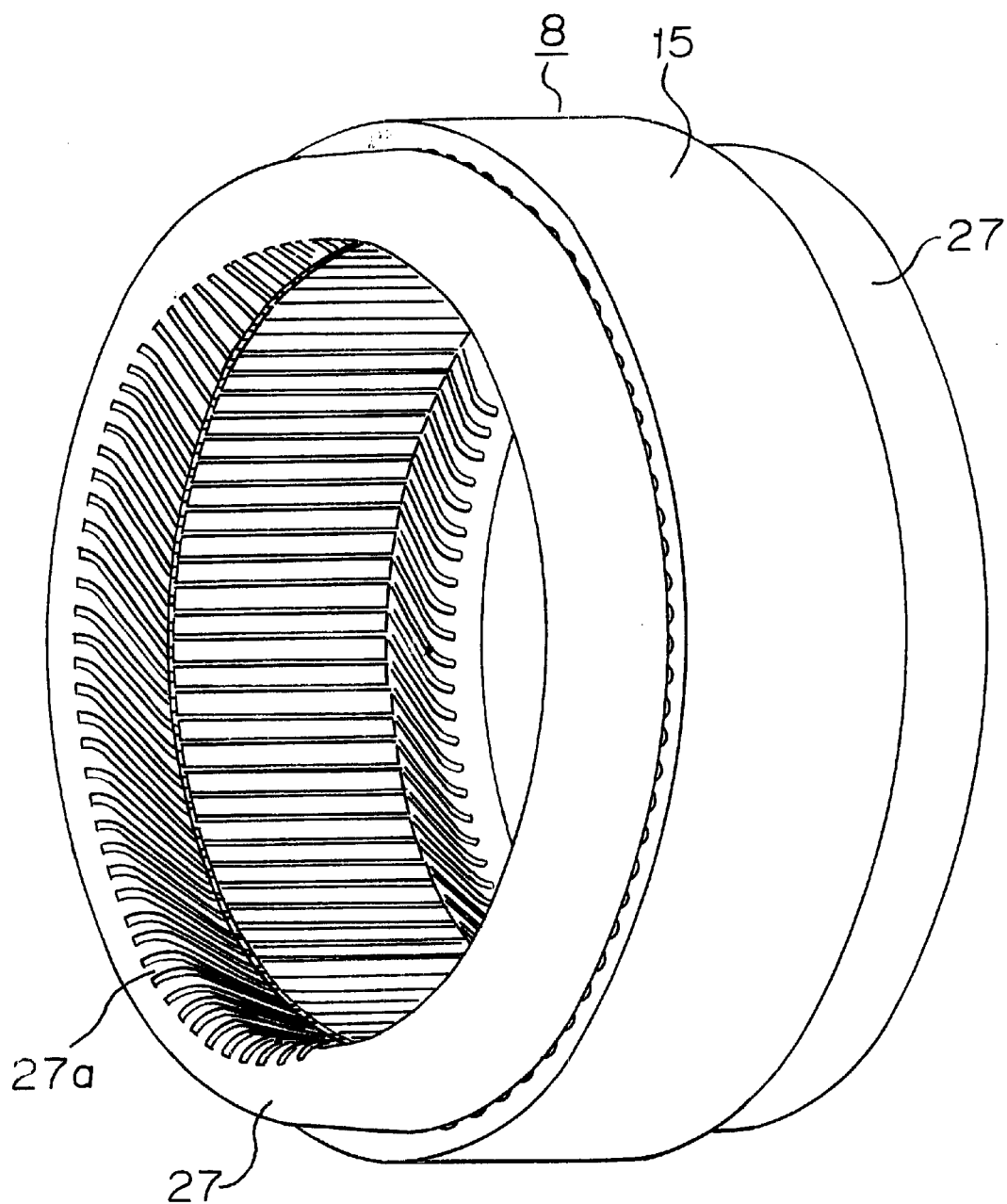
FIG. 11 is a perspective view illustrating a stator used in an a.c. generator for vehicle according to Embodiment 4 of the present invention.

As illustrated in FIG. 11, a resin 27 is coated on entire surfaces of an inner periphery and an outer periphery of the coil ends 16a, 16b of the stator coil 16, and a ring-like portion 27a may be formed on the inner peripheral surface so as to be substantially in correspondence with slants of the coil ends 16a, 16b. Accordingly, insulation in joining portions of the coil ends 16a, 16b and in coils is improved, and a cooling air generated on the inner peripheral surfaces of the coil is controlled by the ring 27a, whereby a wind noise is reduced and a temperature increment is controlled. Further, although the ring 27a is easily formed by providing along slant directions of the coil ends 16a, 16b, it is possible to make the ring 27a slant in directions adverse to the slant directions of the coil.

Further, by providing rings 27a on the outer peripheral surfaces of the coil ends 16a, 16b, it is possible to control a cooling air generated on the outer peripheral surface of the coil by the rings 27a, whereby a wind noise is reduced and an effect of suppressing a temperature increment is obtainable.

Embodiment 5

Figure 12:
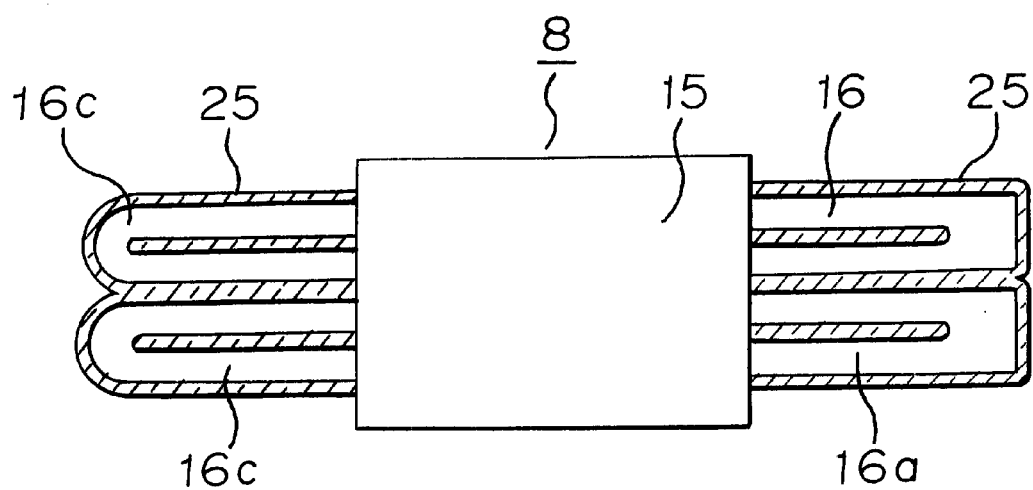
FIG. 12 is a crosssectional view illustrating a stator used in an a.c. generator for vehicle according to Embodiment 5 of the present invention.

Although in Embodiments 1 through 4, a case than the inner coil end 16b is surrounded by the outer coil end 16b at the rear coil ends 16b is described. However, two coil ends 16c having a substantially same height in axial directions may be arranged in radial directions of the stator coil as illustrated in FIG. 12, wherein similar effects and functions to those in Embodiments 1 through 4 are obtainable.

On a bent side of conductor segments 30, a pair of a most inner layer (first layer) and a second layer and a pair of a third layer and a most outer layer (fourth layer) are respectively inserted in slots 15a, which are apart by a magnetic pole pitch. On a joining side, the pair of the most inner layer (first layer) and the second layer and the pair of the third layer and the most outer layer (fourth layer) are respectively welded in a similar manner.

Embodiment 6

Figure 13:
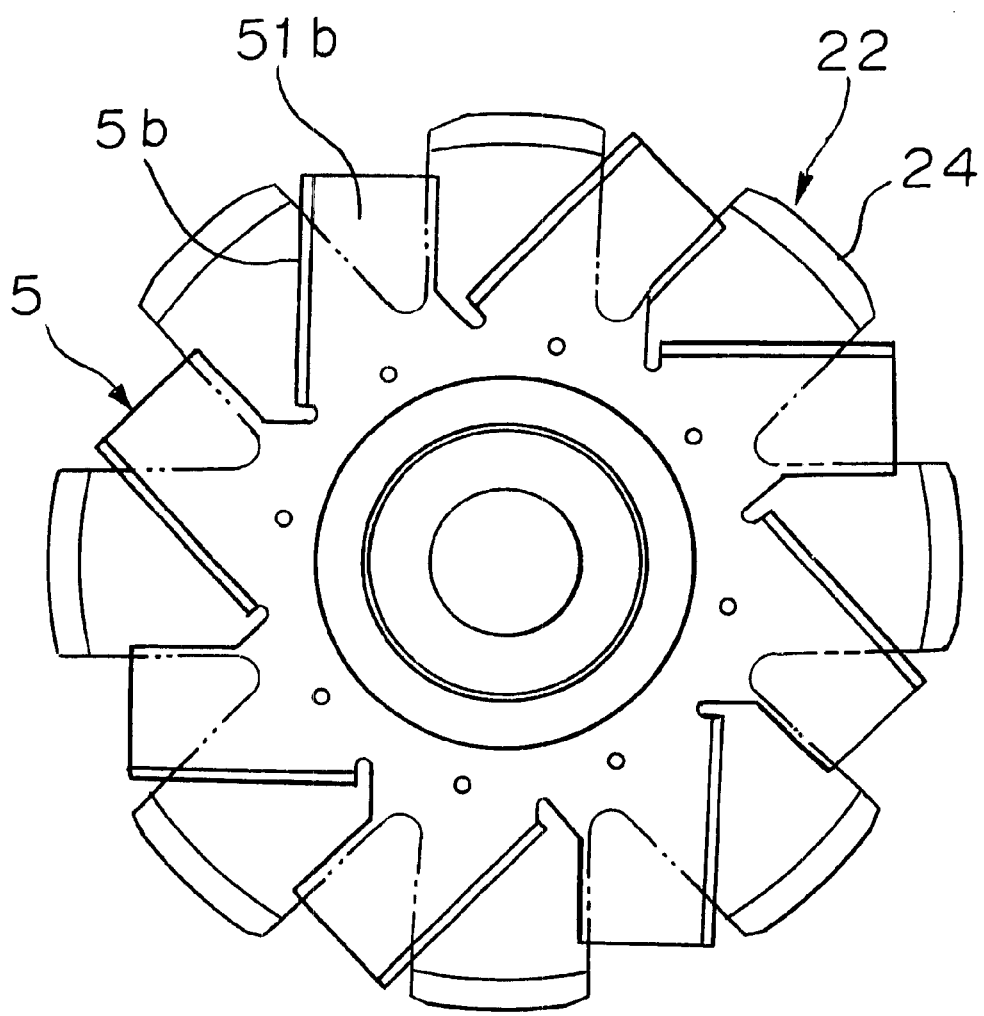
FIG. 13 is a side view illustrating a rotator used in an a.c. generator for vehicle according to Embodiment 6 of the present invention.

As illustrated in FIG. 13, a base plate 51b of blades 5b of a rear fan 5 is enlarged, and the rear fan 5 is fixed to a pole core 22 so as to cover recessed portions between adjacent claw-like magnetic poles 24 on the base plate 51b.

In Embodiment 6, because the recessed portions between the claw-like magnetic poles are shielded by the base plate 51b in an axial direction, a flow rate of an air flowing from a front side to a rear side is decreased.

Accordingly, because an intake flow rate is supplied for cooling coil ends 16a on the front side with a smaller loss, it is possible to further suppress a temperature increment of a stator coil 16. Further, a space in the base plate 51b of blades 5b is substantially shielded by end surfaces of the claw-like magnetic poles 24, a performance of the rear fan 5b is further enhanced; and a flow rate on the rear side is further increased, whereby a temperature increment of a commutator 12 and a regulator 18 can be suppressed.

In Embodiment 6, the number of the blades 5b of the rear fan 5 is eight.

Embodiment 7

Figure 14:
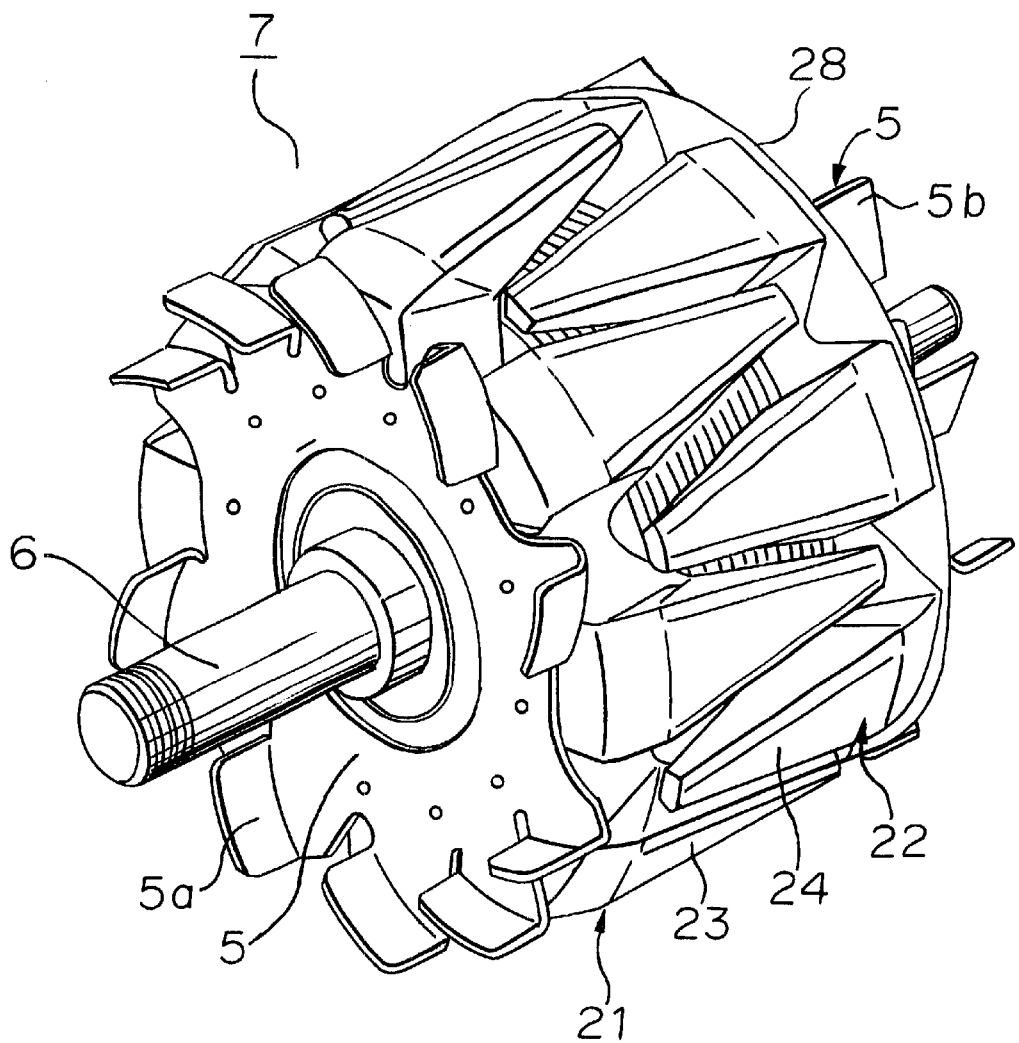
FIG. 14 is a perspective view illustrating a rotator used in an a.c. generator for vehicle according to Embodiment 7 of the present invention.

In Embodiment 7, as illustrated in FIG. 14, a separator 28 is inserted between a rear fan 5 and pole cores 22 to shield spaces between recessed portions of claw-like magnetic poles 24 and a base plate of blades 5b.

In Embodiment 7, because an air flow path of a cooling air flowing from a front side to a rear side is shielded by the separator 28, a flow rate from the front side to the rear side is cancelled. Accordingly, an intake air flow rate on the front side is supplied for cooling coil ends 16a on the front side without a loss, whereby it is possible to certainly suppress a temperature increment of a stator coil 16.

Further, spaces in the base plate of the blades 5b are shielded by the separator 28, whereby a capability of a rear fan 5 is further enhanced; a flow rate on the rear side is increased, whereby it is possible to certainly suppress a temperature increment of a commutator 12 and a regulator 18.

Embodiment 8

In use of a bare wire without an insulating coating for a stator coil 16, it is possible to insulate coils by inserting an insulating paper respectively between a stator core 15 and a stator coil 16 and between stator coils 16 and by coating a resin 25 on coil ends 16a, 16b of the stator coil 16. In this case, by impregnating the resin 25 in the slots 15a, insulation is further improved and the coil is securely fixed.

Embodiment 9

By mixing an additive having heat conductivity larger than the resins 25, 26, 27 with the resins, which are coated on the coil ends 16a, 16b of the stator coil 16, the heat conductivity of the resin is improved and a temperature is further decreased.

Embodiment 10

Although, in the above Embodiments, the fluidization dip is exemplified as a method of coating the resins 25, 26, 27, it is not limited to the fluidization dip. For example, processing steps become easy, for example, by powder coating, in which epoxy powders are sprayed on a heated stator coil 16 to form a predetermined coating.

The first advantage of the a.c. generator for vehicle according to the present invention is that shorting of the coils and noise are prevented; a joining portion of coil ends are not broken; and the joining portion is not cracked, whereby problems that a contact resistance increases and a temperature increases can be solved.

Even though the joining portions are melted by welding and becomes an edge, problems that a high order uncomfortable interference sound and a wind noise occur are solved. Further, it is possible to solve a problem that a high order wind noise caused by a cooling air passing through a gap between coils. Further, it is possible to solve a problem that insulation is spoiled by an extraneous matter intruded between coils at coil ends or directly colliding with the coil to deform the coil.

The second advantage of the a.c. generator for vehicle according to the present invention is that insulation of the joining portions at the coil ends and of all coils is improved and simultaneously a wind noise which occurs in an inner periphery and an outer periphery of the coil ends is reduced because the gaps between the coils are clogged by resin provided on all of peripheries.

The third advantage of the a.c. generator for vehicle according to the present invention is that a cooling air flowing along an inner peripheral surface and an outer peripheral surface of the coil end is controlled, whereby a wind noise is reduced and a temperature increment is suppressed.

The fourth advantage of the a.c. generator for vehicle according to the present invention is that, insulation is further improved by insulating entire coil ends of a stator coil by a resin.

According to the fifth advantage of the a.c. generator for vehicle according to the present invention is that an effect of reducing an interference sound between a fan and a coil end is further enhanced.

According to sixth advantage of the a.c. generator for vehicle according to the present invention is that an interference sound between a fan and coil ends caused by arranging the fan and the coil ends in radius directions of the fan is effectively reduced by disposing a resin.

The seventh advantage of the a.c. generator for vehicle according to the present invention is that a resistance against a flow of an air on an exhaust side of a fan is reduced, and a flow rate of a cooling air, which flows around a commutator, is increased to thereby reduce a temperature of a commutator because the commutator is provided on a bent side of coil ends being short protrusions. Further, both ends of the coil ends are certainly cooled.

The eighth advantage of the a.c. generator for vehicle according to the present invention is that an output of the generator is improved by increasing a flow rate at coil ends on a joining side, which coil ends are long protrusions with a large cooling area, to reduce a temperature increment of a stator coil.

The ninth aspect of the a.c. generator for vehicle according to the present invention is that a commutator and so on, which are provided on a bent side of the coil ends are effectively cooled.

The tenth advantage of the a.c. generator for vehicle according to the present invention is that a commutator and so on are effectively cooled, and a flow of a cooling air from a frame on a pully side to a commutator side is surely shut down.

The eleventh advantage of the a.c. generator for vehicle according to the present invention is that insulation and an effect of reducing a wind noise are enhanced by covering recesses and protrusions of a wound flat rectangular coil.

The twelfth advantage of the a.c. generator for vehicle according to the present invention is that an insulation coating for coils is not necessary and therefore a production cost is reduced.

The thirteenth advantage of the a.c. generator for vehicle according to the present invention is that heat resistance is excellent and insulation is secured.

The fourteenth advantage of the a.c. generator for vehicle according to the present invention is that heat conductivity of a resin provided on coils at coil ends is improved to enhance an effect of reducing a temperature.

The fifteenth advantage of the a.c. generator for vehicle according to the present invention is that workability is good because a resin is provided on coil ends by powder coating and an excessive part is easily removed.

The sixteenth advantage of the a.c. generator for vehicle according to the present invention is that an interface of a paint of a powder fluidized portion in an coil end portion and a resin is easily controlled and workability is good because the resin is provided on coil ends by fluidization dip.

The seventeenth advantage of the a.c. generator for vehicle according to the present invention is that a drying oven for exclusive use and a complicated treatment are not required because a resin to be dried is a single liquid which is dried at an ordinary temperature.

Obviously, numerous modifications and variations of the present invention are possible in light of the above teachings. It is therefore to be understood that within the scope of the appended claims, the invention may be practiced otherwise than as specifically described herein.

What is claimed is:

1. An a.c. generator for a vehicle comprising:
    a rotator having a claw pole;
    a stator arranged opposite to an outer periphery of said rotator;
    a frame for supporting said rotator;
    a commutator provided on one side of said frame; and
    a pulley for driving said rotator, the pulley being provided on the other side of said frame,
    wherein said stator includes a stator core, in which a plurality of slots are formed, and a stator coil provided in said slots, said stator coil being made up of a plurality of joined conductor segments and having coil ends protruding in axial directions of said stator, and said rotator has a blower for sending cooling air to said coil ends by its rotation, wherein said blower is a fan provided at an end portion of said rotator, and
    means for reducing wind noise due to cooling air passing between said coil ends, by blocking air gaps between said coil ends with a resin, while simultaneously compensating for decreased heat transfer due to blockage of said air gaps, by adding an additive to said resin having a higher thermal conductivity than said resin.

2. The a.c. generator for a vehicle according to claim 1, wherein
    said resin is disposed on entire peripheries of said inner peripheral surface and an outer peripheral surface of said coil ends to clog gaps in said stator coil.

3. The a.c. generator for a vehicle according to claim 1, wherein
    said resin is disposed on surfaces of said coil ends to clog gaps in said stator coil.

4. The a.c. generator for a vehicle according to claim 1, wherein
    a surface of coil ends of said stator coil is shaped like a plane without unevenness by said resin disposed on said coil ends.

5. The a.c. generator for a vehicle according to claim 1, wherein
    a ring-like portion is formed on a surface of said coil ends by said resin.

6. The a.c. generator for a vehicle according to claim 1, wherein
    said resin is disposed on both of said coil ends positioned in the axial directions of said stator coil.

7. The a.c. generator for a vehicle according to claim 1, wherein said fan is arranged in radius directions of said stator so that said fan partly overlaps said coil end in the radius directions.

8. The a.c. generator for a vehicle according to claim 1, wherein
    said stator coil is formed by conductor segments in a flat rectangular shape.

9. The a.c. generator for a vehicle according to claim 1, further comprising:
    an insulating paper for insulating said stator core from said stator coil and also insulating gaps in said stator coil,
    wherein
    said stator coil is a bare wire.

10. The a.c. generator for a vehicle according to claim 1, wherein
    said resin is mainly composed of an epoxy resin.

11. The a.c. generator for a vehicle according to claim 1, wherein
    said conductor segments are in a substantially U-like shape, and
    one of said coil ends is positioned on a joint side of said conductor segments and the other coil end is positioned on a bent side of said conductor segments.

12. The a.c. generator for a vehicle according to claim 11, wherein
said fan is provided on both sides of said rotator so as to be respectively opposite to said coil ends on the joint side and the bent side, and said commutator is provided on the bent side.

13. The a.c. generator for a vehicle according to claim 12, wherein
a flow rate received by said coil end on the joint side is larger than that received by said coil end on the bent side.

14. The a.c. generator for a vehicle according to claim 12, wherein
the number of blades of said fan opposite to said coil end on the bent side is larger than the number of blades of said fan opposite to said coil end on the joint side.

15. The a.c. generator for a vehicle according to claim 12, wherein
a maximum height of blades of said fan at said coil end on the bent side is higher than a maximum blade height of said fan at said coil end on the joint side.

16. The a.c. generator for a vehicle according to claim 12, wherein
spaces formed in a base plate of said fan on the bent side at said coil end are substantially shielded by an end surface of said magnetic poles of said rotator.

17. The a.c. generator for a vehicle according to claim 12, wherein said rotator includes a plurality of claw poles having recessed portions formed therein, and the generator further comprises a separator which is provided between the recessed portions of said claw poles of said rotator on a side of the commutator and a base plate of said fan.

* * * * *